(12) United States Patent
Hindus et al.

(10) Patent No.: US 6,282,206 B1
(45) Date of Patent: Aug. 28, 2001

(54) VARIABLE BANDWIDTH COMMUNICATION SYSTEMS AND METHODS

(75) Inventors: Debby Hindus; Scott Mainwaring, both of San Francisco; Elin Pedersen, Redwood City; Sean Michael White, San Francisco, all of CA (US); William Gaver, London (GB)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/169,713

(22) Filed: Oct. 9, 1998

Related U.S. Application Data

(60) Provisional application No. 60/103,814, filed on Oct. 8, 1998, and provisional application No. 60/062,144, filed on Oct. 9, 1997.

(51) Int. Cl.[7] ................................. H04J 3/16; H04J 3/22
(52) U.S. Cl. ............................................................ 370/468
(58) Field of Search ..................................... 370/468, 465, 370/276, 278, 280, 281, 294, 295; 375/222

(56) References Cited

U.S. PATENT DOCUMENTS

| | | | |
|---|---|---|---|
| 4,780,883 | * 10/1988 | O'Connor | 375/222 |
| 4,882,726 | * 11/1989 | Lang et al. | 375/222 |
| 4,893,305 | * 1/1990 | Fernandez et al. | 370/222 |
| 5,231,649 | * 7/1993 | Duncanson | 375/222 |
| 5,790,138 | * 8/1998 | Hsu | 345/512 |
| 5,812,430 | * 9/1998 | Altschuler et al. | 364/572 |

* cited by examiner

*Primary Examiner*—Ajit Patel
(74) *Attorney, Agent, or Firm*—Oppenheimer Wolff & Donnelly, LLP

(57) ABSTRACT

A variable bandwidth communication system includes a first communication station and a second communication station coupled to the first communication station for continuous, by directional communication. The first communication station is capable of transmitting at a first bandwidth and a second bandwidth greater than the first bandwidth, and is capable of receiving at a third bandwidth and a fourth bandwidth greater than the third bandwidth. The transmitting bandwidth of the first communication station is selectable by first user. The second communication station is capable of receiving at the first bandwidth and at the second bandwidth and is capable at transmitting at the third bandwidth and the fourth bandwidth. Again, the transmitting bandwidth of the second communication station is selectable by the second user. Preferably, but not necessarily, the first bandwidth and the third bandwidth are about the same, and the second bandwidth and the fourth bandwidth are about the same. The first communication system is capable of displaying communication received at the fourth bandwidth at a first lower bandwidth display level, and the second communication system is capable of displaying communications received at the second bandwidth at a second lower bandwidth display level. In this fashion, two or more users can interact at a variety of threshold levels dependent upon the user's desires for privacy and/or high bandwidth communications.

22 Claims, 9 Drawing Sheets

86

| HIGH BANDWIDTH INPUT TYPE | LOW BANDWIDTH OUTPUT TYPE EXAMPLES |
|---|---|
| VIDEO | A) TOONED VIDEO<br>B) REDUCED RESOLUTION VIDEO<br>C) AUDIO OUTPUT |
| AUDIO | A) DEGRADED AUDIO<br>B) HAPTIC |
| ANY | A) ABSTRACT REPRESENTATIONS<br>   1) BOUNCING BALLS<br>   2) CHANGING COLORS<br>   3) TWITTERING BIRDS |

FIG. 5

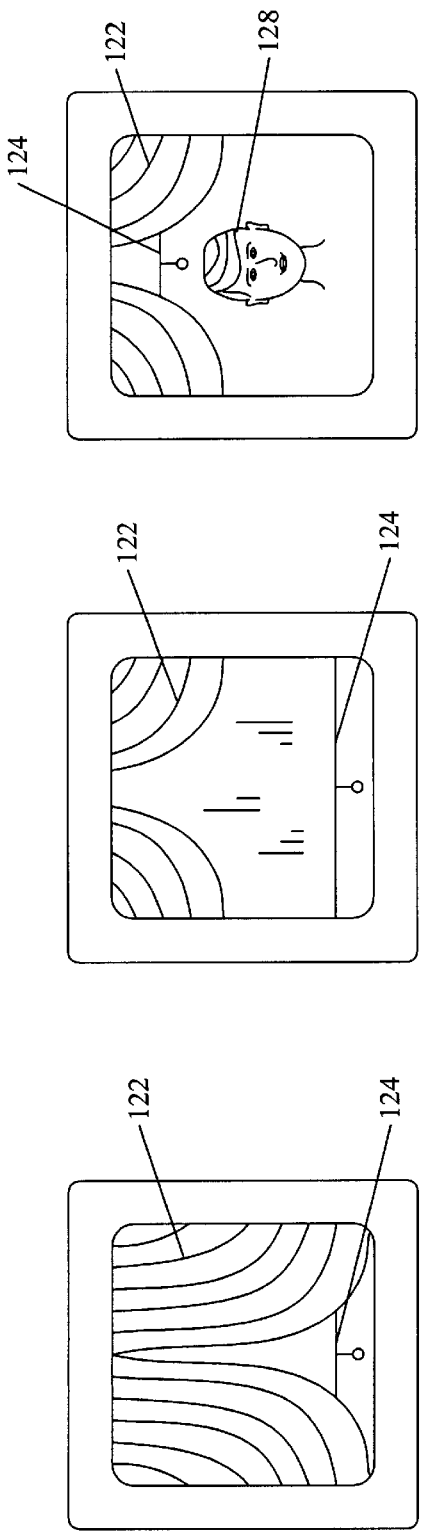

VARIABLE BANDWIDTH COMMUNICATION SYSTEMS AND METHODS

CROSS REFERENCE TO RELATED APPLICATIONS

This Application is related to and claims the benefit of U.S. Provisional Patent Application No. 60/062,144 filed Oct. 9, 1997, incorporated herein by reference. This Application is also related to and claims the benefit of U.S. Provisional Patent Application No. 60/103,814 entitled METHODS AND APPARATUS FOR REMOTE SOCIAL INTERACTIONS filed Oct. 8, 1998, incorporated herein by reference. This Application is also related to U.S. patent application Ser. No. (a) 09/169,750 entitled METHOD AND APPARATUS FOR SENDING AND RECEIVING LIGHT-WEIGHT MESSAGES filed Oct. 9, 1998, (b) Ser. No. 09/169,839 entitled METHOD AND APPARATUS FOR SENDING PRESENCE MESSAGES filed Oct. 9, 1998, and (c) Ser. No. 09/169,638 entitled ELECTRONIC AUDIO CONNECTION SYSTEM AND METHODS FOR PROVIDING SAME filed Oct. 9, 1998, all three being incorporated herein by reference.

BACKGROUND OF THE INVENTION

1. Field of the Invention

This invention relates generally to communication systems, and more particularly to electronic communication systems having variable bandwidths for continuously and bi-directionally linking two or more geographically separated spaces for remote social interaction.

2. Description of the Related Art

People use between-household communication primarily for social reasons: to keep in touch with and coordinate joint activities with a limited number of friends and family. Households are currently linked to one another primarily by telephones and by telephone-extension devices such as answering machines. Other technologies (e.g., the postal service, email, fax), are used on a more limited basis.

Such ongoing contact with significant others is a fundamental human need, and one that current household technologies meet in a less than optimal way. First, there is no technological support for a household to have continuous background awareness of distant households that it cares about, in the way that it has some ongoing awareness of physically neighboring households (e.g., by noticing a car is in the driveway, a lighted window, or muffled sounds of a conversation). Such awareness would allow conversations to take place opportunistically that currently do not take place, and might allow certain currently unwanted conversations to be avoided if such background awareness was sufficient for feeling "in touch."

In addition, the telephone (currently the primary technological support for remote conversations) embodies a model for initiating and disengaging from social interaction that is rarely found in everyday life. Disregarding for the moment non-basic elements such as busy signals, answering machines, caller-ID, etc., the telephone provides three states: disconnected, ringing, and connected. The model of social interaction created is akin to that created by a windowless room with a closed, locked, and soundproof door. Callers are forced to initiate interaction by knocking (ringing), without any advance indication of the callee's situation within. Similarly, the callee is forced to decide whether to unlock and open the door with very limited information (even more limited in the telephone case, as ringing cannot be varied as can knocking). Once unlocked and thrown open, the conversational partners confront each other at close range, with little ability to adjust social distance to a mutually desired level. Conversations end, with little subtlety or room for re-engagement, by shutting the door and returning to an entirely disengaged state. People have adapted to such an unnatural model remarkably well, but a technology that offers a more flexible and subtle model of gradual, foreshadowed, and mutually-negotiated approach would be highly desirable.

There is presently a lack of devices which simply relay information concerning the presence of individuals at remote locations for social purposes. Functionally, the closest analog to a social presence device is the real-world situation of living next door to a neighboring house. In such a situation, one can notice various things about the neighbor's house (and patterns in the neighbors activity) that would allow one to initiate a conversation at an opportune time, if one so wished.

Baby monitors, both audio and now video, are one of the few, if not the only, awareness technologies on the market. In the CSCW (Computer Supported Cooperative Work) research world, Montage from Sun Microsystems implements a kind of "video glancing" that allows messages to be left if "glancing" reveals the recipient to be unavailable.

The term "media space" refers to the linking of a number physically separated spaces to create a larger "virtual space" for communication between various individuals. Researchers have noticed that it is very difficult to document an objective gain from use of media spaces in workplaces, but also that the users nevertheless were unanimous about the usefulness of these systems. A stated advantage is the social awareness that is provided and which may be conducive to deciding when direct communication would be appropriate. The awareness issue is sometimes referred to as the support for background communication, see for instance William Buxton's GI (Graphical Interface) '95-paper about foreground and background.

A problem with media space is that it is typically a high-bandwidth medium, which creates serious privacy issues. The "Porthole System" from Rank Xerox EuroParc partially addresses this problem by sacrificing image quality in order to obtain a continued sense of presence without providing real-time imagery. However, their choice was to lower the frame rate while keeping the image resolution high. Avatar design and research provides abstraction and synthesization to reduce the privacy issue.

Technologies that allow a communicating party to refuse a connection attempt without having to give an explicit refusal of access include: caller ID, call screening through answering machines; mirror windows, door spies. However, these technologies provide this feature unilaterally, namely to the callee only. Other technologies that allow a communicating party to "prepare" for the communication: media space systems that convey room images.

What the related art does not suggest, however, are classes of technologies of varying bandwidths that permit remote social interactions at different threshold levels for a variety of purposes.

SUMMARY OF THE INVENTION

The present invention provides a remote communication system capable of communicating at various bandwidths. By "bandwidth" it is meant the amount of information that must be transmitted, received, stored, or displayed within a given period of time. Users of the system can use a "negotiation" process to determine the bandwidth of the transmitted communications and the bandwidth, or intrusiveness, of the resultant display.

A variable bandwidth communication system of the present invention includes a first communication station and a second communication station coupled to the first communication station for continuous, bi-directional communication with the first communication station. The first communication station is capable of transmitting at a first bandwidth and a second bandwidth that is greater than the first bandwidth, and is capable of receiving at a third bandwidth and a fourth bandwidth greater than the third bandwidth. The transmitting bandwidth of the first communication station is selectable by a first user. The second communication system is capable of receiving at a first bandwidth and at the second bandwidth, and is capable of transmitting at the third bandwidth and the fourth bandwidth. The transmitting bandwidth of the second communication station is selected by a second user. Preferably, but not necessarily, the first bandwidth and the third bandwidth are about the same, and the second bandwidth and the fourth bandwidth are about the same. Often, the second bandwidth is at least two orders of magnitude greater than the first bandwidth.

A method for variable bandwidth communication in accordance with the present invention includes selectively and continuously transmitting communications from a first communication station at one of a first bandwidth and second bandwidth, and continuously receiving communications at the first communication station at one of a third bandwidth and a fourth bandwidth. A method further includes selectively and continuously transmitting communications from a second communication station at one of the third bandwidth and the fourth bandwidth, and continuously receiving communications at one of the first and second bandwidth. The second bandwidth is greater than the first bandwidth, and the fourth bandwidth is greater than the third bandwidth. Preferably, but not necessarily, the first bandwidth and third bandwidth are about the same and the second bandwidth and the fourth bandwidth are about the same.

A communication station in accordance with the present invention includes a data processor, a high-bandwidth input device coupled to the data processor, a transmission port coupled to the data processor, a reception port coupled to the data processor, a high/low transmission bandwidth selector coupled to the data processor, and a high/low display bandwidth selector coupled to the data processor. The communication station further preferably includes a dynamic abstraction filter for converting high bandwidth communications (e.g. streaming video) into low bandwidth communications.

The advantage of the present invention is that a continuous communication between two remote sites can be maintained at various bandwidths. For example, a user of that particular site may decide that it only wishes to transmit or receive high threshold (low bandwidth) presence type information in order to be only minimally disturbed. Alternatively, a high bandwidth communication, such as real-time video, can be provided between two remote sites based upon a mutual consent of users at those two remote sites.

These and other advantages of the present invention will become apparent to those skilled in the art upon a reading of the following descriptions of the invention and a study of the several figures of the drawing.

BRIEF DESCRIPTION OF THE DRAWINGS

FIG. 5 is a chart illustrating various types of low bandwidth outputs associated with various types of high bandwidth inputs;

FIGS. 6A–6C illustrate three different modes or thresholds used in the system of FIG. 6;

FIG. 6D is a chart illustrating the relationship between the curtain position, the shade position, and the receivers message with regards to the system of FIGS. 6 and 6A–6C;

DETAILED DESCRIPTION OF THE PREFERRED EMBODIMENTS

Figure 1:
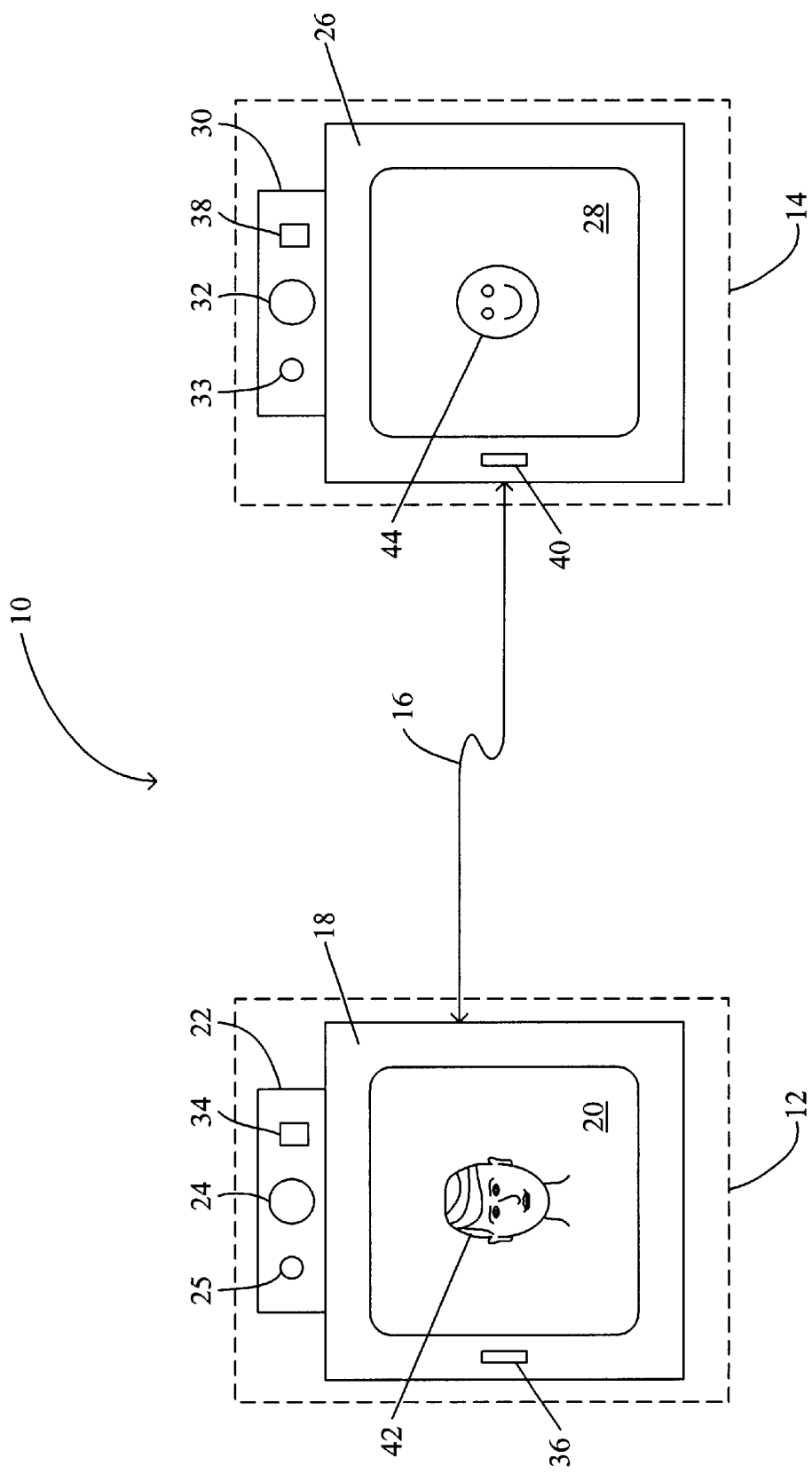
FIG. 1 illustrates a variable bandwidth communication system in accordance with embodiment of the present invention.

The present invention includes a range of appliances that can provide communications of various bandwidths from lightweight to heavy-duty between homes to permit various forms of remote social interactions. By "bandwidth" it is often meant the amount of data required for the communication process in a given period of time (e.g. bits/second of data). It should be noted that a low bandwidth transmission could send a few bits, bytes, or packets at a very fast rate, and then have a long pause before the next "burst" of transmission. Therefore, the magnitude of the bandwidth is a time-averaged function including both the number of bits per second that can be sent and the "duty cycle" of the transmission, i.e. how much of the transmission time includes no information. In an even broader sense, "bandwidth" refers to the intelligible information content of the communication. Typically, the lower the intelligible information content, the lower the number of average bits/second are required. However, in some instances, a "low bandwidth" communication could have about the same or even higher average bits/second than a "high bandwidth" communication. For example, a filtered video and/or audio communication would have a lower intelligible information content, and therefore would be "lower bandwidth", than a full video and/or audio communication, even though the filtered video and/or audio communication may take as many or more average bits/second to transmit or display. By "communication" or "communication process" it is meant the transmission, reception, storage, or display of information.

Many of the embodiments described herein can be either a dedicated appliance or software running on a general purpose computer (PC), network PC, or network computer (sometimes referred to as an "Internet terminal"). General concepts linking various embodiments of the present invention are set forth below.

General Concepts

It is desirable to design the various embodiments of the present invention so that they fit seamlessly into household activities. It is this which influences thinking about them as 'appliances' rather than as computers, although they typically incorporate microprocessors, memory, and I/O, as do general purpose computers.

Another aspect of the present invention is the concept of "thresholds." The "threshold" of an appliance is inversely related to the bandwidth of the communication, and determines the character and quantity of the social communication. For example, presence information requires very little bandwidth and has a high "threshold."

Embodiments of the present invention employ a system of abstract representations that convey pertinent presence and mode information without revealing information that may be perceived to be too personal. The system is intended to augment or replace general media space systems, i.e., systems that support high bandwidth communication between remote sites.

The present invention therefore balances two conflicting goals: on one side the desire to be connected with and be knowledgeable about activities in a remote place, and on the other side the wish to preserve personal integrity and maintain private lives.

The common solution found in the appliances of the present invention is to allow the display of abstract representations of activity in a low bandwidth mode as a way to provide "low-impact" insight into activities at a remote site. An additional benefit of the present invention is a generally low average bandwidth requirements (i.e. the average of the low bandwidth mode to the high bandwidth mode is low) in settings that have continuous or almost continuous connectivity. One preferred approach of the present invention is keep the frame rate at standard transmission rates but cut the resolution dramatically, e.g. by "cartoonizing" or "tooning" by several orders of magnitude (before compression) and in abstraction by replacing a full frame with a few integers.

The problem solved by the present invention is to provide enough information for remote parties to get a "sufficient" sense of what is going on without giving away "too much." By a negotiation process between the sender and receiver, the communication can range between high bandwidth (e.g. video or high fidelity audio) communications and low bandwidth communications.

Media space technology can be augmented with a threshold model of the present invention and thereby solve some pertinent problems in technology mediated communication. The transition between being unconnected and being connected is very abrupt in existing technology. Take for instance the telephone, where the callee gets a sudden and urgent signal even if the call may have been in preparation for long time (a view to the calling site might have "warned" that a call was under way). The threshold model of the present invention provides a methodology for ongoing connectivity and, contrary to traditional media spaces, it does so without sacrificing reasonable wants for privacy, simply by allowing connectivity on less "invasive" levels than full media flow. Further, the transition between being unconnected and being connected is binary in existing telephony: there is no graceful way for a callee to indicate that an interruption might be inappropriate at this very time. The present threshold model provides means for gradual approach (and withdrawal for that matter) that will allow users to apply a richer and less strict negotiation pattern. The model of the present invention mimics some characteristics of immediate social interaction, in particular discrete thresholds, plateaus between thresholds, to linger on for a while, and multiple consecutive thresholds.

A useful thresholding scheme of the present invention is:

TABLE 1

| Threshold | plateau = representation |
|---|---|
| Lowest | Unlimited |
| degraded | 'tooned media (thresholded video and "mumbler" audio) |
| recreated | Avatar animation - with dynamics based on extracted sensor data |
| synthetic | Pure abstract animation - with dynamics based on sensor data |
| binary | Binary connectivity info (any connection at all?) |
| highest | No connection |

Different people may prefer different combinations of representation: some may want both audio and visual output while others may want to ban one of these entirely. Each plateau specifies a certain representation of a site. It can be represented either directly by video, audio and other sensor data; or it can be remapped or synthesized (in relation to the original source of this information).

SPECIFIC EXAMPLES

A variable bandwidth communication system 10 in accordance with the present invention includes a first communication station 12 and a second communication station 14. The first communication station is capable of transmitting at at least two bandwidths. That is, the first communication station is capable at transmitting at least a first bandwidth and a second bandwidth, where the second bandwidth is greater than the first bandwidth. Again, by "bandwidth" it is meant a required data rate (e.g. bits per second) required for the transmission, reception, storage, display, etc. of the communication. The second communication station 14 is coupled to the first communication station 12 as indicated at 16 for continuous, bi-directional communication with the first communication station. The second communication station 14 is capable of receiving at the first bandwidth and at the second bandwidth, is capable of transmitting at the third bandwidth and at the fourth bandwidth. Preferably, but not necessarily, the first bandwidth and the third bandwidth are about the same, and the second bandwidth and the fourth bandwidth are about the same.

A communication coupling 16 can be accomplished in a variety of fashions. For example, the coupling (or "connection", "data link", "transmission medium", etc.) 16 can be by wire (e.g. twisted pair wire), by cable, by fiber optic, by radio or infrared (IR) transmission and reception, by a local area network (LAN), by a wide area network (WAN), by the Internet, etc. The essential feature of the connection 16 as a whole is that it must be bi-directional and capable of transmitting at both high and low bandwidths. In some embodiments of the present invention, this is accomplished by a single transmission medium, and in other embodiments of the present invention this is accomplished by a plurality of transmission mediums, e.g. a high bandwidth transmission medium and a low bandwidth transmission medium. Also, in other embodiments of the present invention the coupling 16 may include a number of simplex ("one way") transmission media, e.g. one or more simplex transmission media extending from communication station 12 to communication station 14, and one or more simplex transmission media extending from communication station 14 to communication station 12 as opposed to a duplex ("two way") transmission medium.

The present invention can include unintentional presence capabilities. That is, a sensor forming a part of a communication station can automatically sense the presence or absence of a user, and automatically transmit this presence information to one or more other communication stations. Preferably, this unintentional presence capability can be disabled by the user of the communication station if a higher level of privacy is desired.

In the embodiment of FIG. 1, communication station 12 includes a monitor or display 18 having a screen 20 and a camera 22 having a lens 24 and a microphone 25. Likewise, second communication station 14 includes a monitor or display 26 having a screen 28 and a camera 30 having a lens 32 and a microphone 33. It should be noted that the term "video" as used herein often, but not necessarily, also includes an accompanying "audio" component as detected, for example, by the microphone 25 and 33, respectively. While the first communication station 12 and the second communication 14 of this example are the same type of station, it should be noted that communication stations of different types can be used together to form part of a variable bandwidth communication system 10. Furthermore, while this example shows communication between two stations, it should be noted the principles of this invention can be extended to three or more stations as well, as will be discussed in greater detail subsequently.

The variable bandwidth communication system 12 further includes a switch 34 to vary the transmission bandwidth of the system 12, and a switch 36 to vary the display bandwidth of the monitor 18. Again, by "display bandwidth" is not meant to necessarily indicate the amount of information sent to the display but, rather, the time-varying amount of information that is presented by the display. That is, a high display bandwidth is required for a low viewer threshold, while only a low display bandwidth is needed for a high view threshold.

While these user-selectable controls are illustrated and described as switches on the camera 22 and monitor 18, respectively, it should be noted that a variety of user input mechanisms can be used. For example, the communication station 12 can form a part of a computer system wherein a mouse or other pointer can be used to actuate on-screen "buttons" to perform the equivalent functions of switches 34 and 36. Other equivalent input mechanisms are well known to those skilled in the art.

The second communication station 14 likewise includes a button or switch 38 to control the transmission bandwidth and a button or switch 40 to control the display bandwidth on the screen 28 of monitor 26. The same comments as far as other equivalents for switches 38 and 40 as were made with respect to first communication system 12 also applied to this second communication system 14.

Displayed on the screen 20 of communication station 12 is a video image 42 of the head of the user of the second communication station 14. This high bandwidth, low threshold display on screen 20 indicates that the user of communication station 14 has selected a high bandwidth transmission option with his user selector switch 38, and that the user of the first communication station 12 has selected a high bandwidth display option with his switch 36. The two users have therefore "negotiated" the display on the screen 20 of the first communication station 12 in that the sender has indicated that he wishes to send high bandwidth, real-time video from his camera 30 to the station 12, and that the receiver is willing to view this high bandwidth display.

In contrast, a low bandwidth image 44 is displayed on the screen 28 of the second communication station 14. This can be the result of any of at least three types of negotiation. In a first negotiation, the user of the first communication station 12 has moved the switch 34 to low bandwidth mode and the switch 38 of the second communication 14 is also in the low bandwidth mode as set by a second user. Alternatively, the switch 40 of second communication station 14 could be in the high bandwidth display mode, and still the image 44 on the screen would be in the low bandwidth mode since that is all that is being transmitted from the communication 12. Thirdly, the switch 34 of communication station 12 can be in a high bandwidth mode and the switch 40 of the communication station 14 can be in a low bandwidth thereby displaying a low bandwidth image 44 even though a high bandwidth image has been received over the communication link 16.

Figure 2:
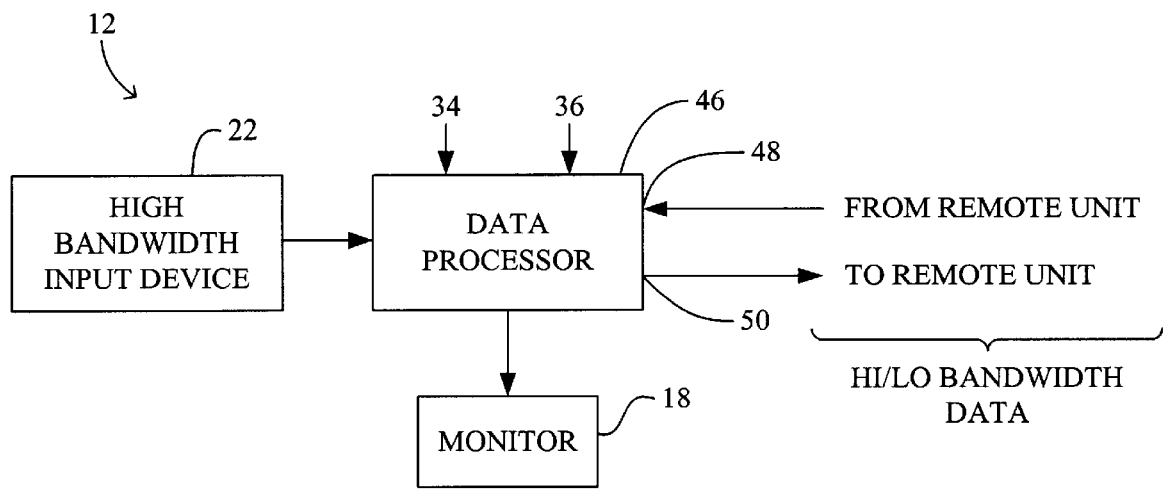
FIG. 2 is a block diagram of a communication station FIG. 1.

In FIG. 2, a first communication station 12 is illustrated in block diagram form. As discussed previously, this block diagram can also apply to the second communication station 14. Central to the communication station 12 is a data processor 46. Physically, this data processor can be positioned in any suitable enclosure such as the monitor 18 enclosure, the camera 22 enclosure, or a separate enclosure (not shown in FIG. 1). In some embodiments of the present invention the data processor 46 may be a personal computer system or a computer workstation (not shown). Alternatively, the data processor can be a dedicated, microprocessor based system.

The data processor 46 has, as inputs, the switches 34 and 36, and a high bandwidth input device such as camera 22. The data processor further has an input port 48 and output port 50, and is connected to the monitor 18. Communication from a remote unit, such as the second communication station 14, is input into the input port 48 and a communication output to the remote unit, such as communication station 14, is provided output port 50. The output communication to the remote unit can be high or low bandwidth data, as described previously.

Figure 3A:
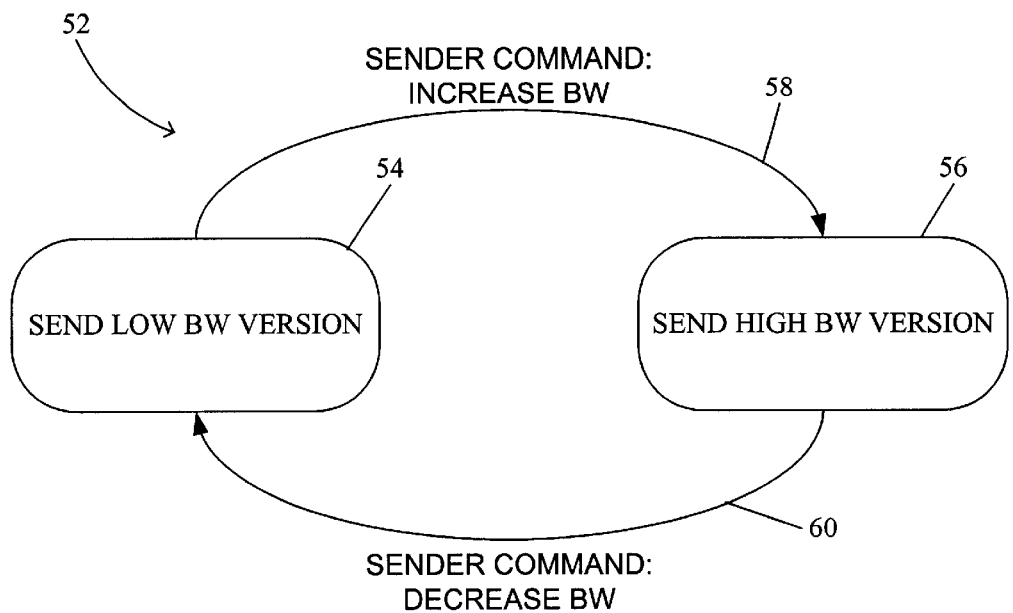
FIG. 3A is a state diagram illustrating a "send" process implemented on the data processor of FIG. 2.

In FIG. 3A, a transmitting process 52 operating on the data processor 46 of FIG. 2 is illustrated. Essentially, the transmitting process 52 is one of two states, namely a "send low bandwidth version" state 54 and a "send high bandwidth version" state 56. If the process 52 is in state 54, a sender's command 58 to increase bandwidth causes the process 52 to enter state 56. If the process 52 is in state 56, a sender's command 60 to decrease bandwidth causes the process 52 to enter state 54.

In the examples of FIGS. 1 and 2, the "sender commands" are determined by the switch state ("position") of the switch 34 on the camera 22. That is, when the switch 34 is in a first position the sender is commanding an increase in bandwidth, and when the switch is in a second position the sender is commanding a decrease in bandwidth. Of course, there are many equivalent methods and apparatus for entering sender commands into a first communication station 12, as noted previously.

As will be apparent by a study of FIGS. 2 and 3A, while the input to the data processor 46 is always high bandwidth from the high bandwidth input device 22, the output on output port 50 can either be a high bandwidth version or a low bandwidth version. Preferably, the low bandwidth version of the communication is derived from the high bandwidth version. That is, the high bandwidth version is converted by an appropriate process or "filter" to a low bandwidth version which still communicates some of the information that was present within the high bandwidth version. This process will be discussed in greater detail subsequently.

Figure 3B:
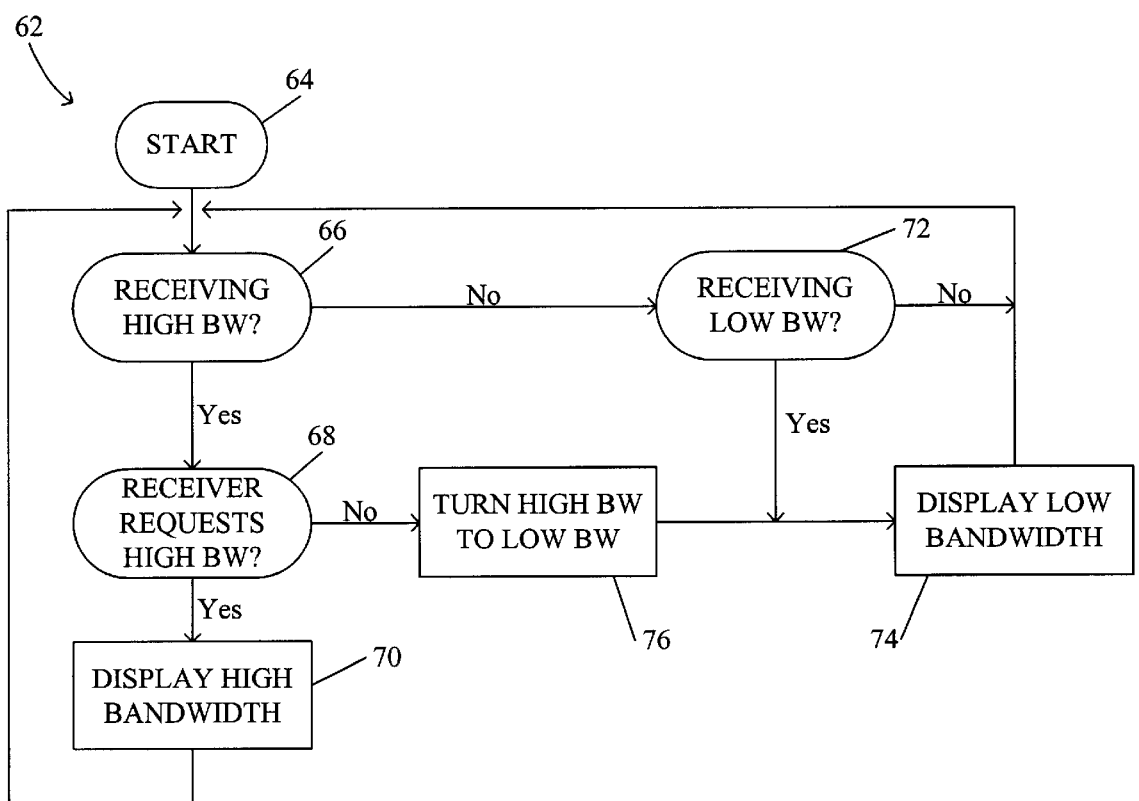
FIG. 3B is a flow diagram illustrating a process for receiving communications which is implemented on the data processor of FIG. 2.

In FIG. 3B receiving process 62 implemented on the data processor 46 of FIG. 2 is illustrated in flow diagram form. The process 62 begins at 64 and, in an operation 66, it is determined whether the first communication station 12 is receiving high bandwidth communication. If it is, an operation 68 determines whether the receiver is requesting high bandwidth reception. In the example of FIGS. 1 and 2, this is determined by the position of the switch 36 as set by the receiver. If the receiver is requesting high bandwidth, then a high bandwidth image is displayed on the monitor 18. Process control then returns to operation 66.

If operation 66 determines that it is not receiving high bandwidth communications on the port 48, then operation 72 determines whether it is receiving low bandwidth communication. It is determined that the communication station 12 is receiving neither high bandwidth nor low bandwidth communication, process control is returned to operation 66. In that instance, no communication is being received at all and the process 62 simply waits for some form of communication. If operation 72 determines that there is low bandwidth communication on the input port 48, the low bandwidth communication is displayed in an operation 74, and process control is returned to operation 66.

Finally, if operations 66 and 68 determine that the communication 12 is receiving high bandwidth communication and that the receiver requests low bandwidth, an operation 76 converts the high bandwidth communication to a low bandwidth communication. Operation 74 then displays the converted low bandwidth communication, and process control is returned to operation 66.

It should be noted that in an alternate embodiment of the present invention high bandwidth transmissions could always be made by a transmitting station, as long as the high bandwidth transmission is accompanied by an indication of the sender as to whether the actual display should be high bandwidth or low bandwidth. That is, the low bandwidth conversion could always be generated at the receiving communication station. However, such an embodiment has several disadvantages. For one, the communication channel 16 must be of a high average bandwidth, which typically increases the cost of the system. Furthermore, the sender of the high bandwidth communication must trust the receiver to respect his wishes as to having a low bandwidth display. For the foregoing reasons, it is desirable that the sending communication station be capable of creating the low bandwidth version of the communication for transmission to the receiving communication station.

Figure 4:
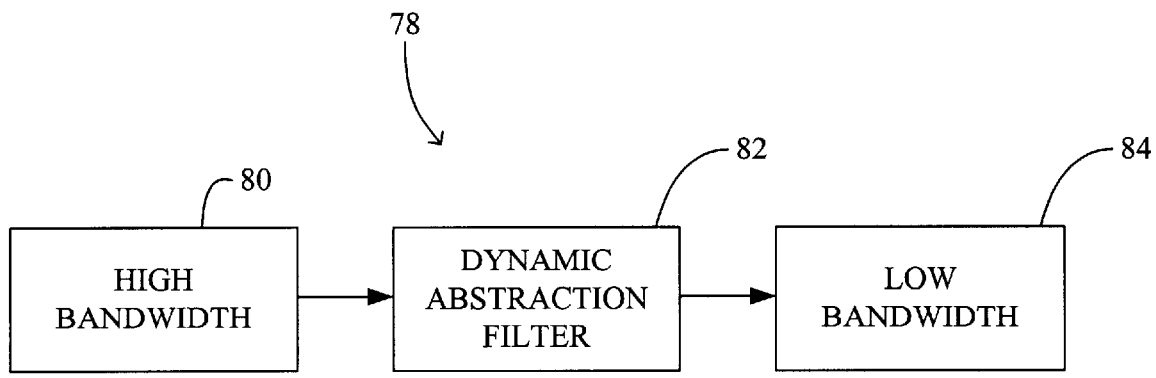
FIG. 4 is a block diagram illustrating the use of a dynamic abstraction filter to convert a high bandwidth communication to a low bandwidth communication or display.

A process 78 for converting high bandwidth data to low bandwidth data is illustrated in FIG. 4. The process 78 begins with high bandwidth data 80 which is then passed through a dynamic abstraction filter 82 to result in low bandwidth data 84. This process 78 is accomplished within the operation 54 of sending the low bandwidth version in FIG. 3A, and within the operation 76 of turning the high bandwidth to a low bandwidth communication in FIG. 3B. There are a variety of models and techniques for creating a dynamic abstraction filter 82, as will be discussed subsequently.

In FIG. 5, a table 86 lists high bandwidth input types with low bandwidth output examples. The dynamic abstraction filter 82 of FIG. 4 is used to convert the high bandwidth input type to the low bandwidth output types. By "dynamic" it is meant that changes in a high bandwidth communication are reflected in changes in the low bandwidth communication. For example, movement of an object in a high bandwidth video communication can be reflected in a change in the low bandwidth communication, e.g. by showing movement of a simpler object, changing a color of the display screen, etc. As another example, changes in volume of a high bandwidth audio signal may be reflected in the low bandwidth representation. By "abstraction" it is meant that certain features of a high bandwidth signal are represented in an abstract fashion in the low bandwidth output signal.

In FIG. 5, one form of high bandwidth input type is video. Examples of low bandwidth output types include cartooned (or "tooned") video, reduced resolution video, and audio output. With a 'tooned video, a simplified, abstract, yet dynamic representation of a video object is created in a cartoon-like fashion. An example is shown in image 44 of FIG. 1. In this instance, the camera 22 of the first communication station 12 captures the image of the sender, and passes the image through the dynamic abstraction filter of FIG. 4 to create the representational image 44. The representational image 44 is low bandwidth in that it takes relatively few bits per second to transmit any dynamic updates to the image 44 from the first communication station 12. That is, as the sender of first communication station 12 moves or changes his facial expression, the dynamic abstraction filter 82 causes, on a periodic basis, the image 44 to dynamically change.

With reduced resolution video, the high bandwidth input video is degraded to reduce the bandwidth transmission requirements of the degraded video frame. It is preferred that this degradation reduces the resolution of the pixel components of the video frame, rather than changing the frame rate of the video, as has occurred in the prior art. This is because of the reduction of the frame rate of video results in a jerky and somewhat annoying output for the video, while the resolution degradation of the prior art provides a smooth, yet dynamically abstracted version of the original high bandwidth of the video.

As a third example, the high bandwidth video input can be converted into a lower bandwidth audio output. The audio output itself can actually be of quite good fidelity, while still being much lower in bandwidth than the high bandwidth communication. This, therefore, is an example that illustrates that "high bandwidth" and "low bandwidth" can be relative rather than absolute terms. Generally speaking, the difference between a high bandwidth signal and a low bandwidth signal is intended to be at least two orders of magnitudes, although sometimes it may be six orders of magnitudes in difference or more. In this example, the audio output can include such characteristics as type, volume, pitch, etc. The dynamic abstraction filter 82 will analyze various components of high bandwidth video such as movement, brightness, number of objects in the frame, etc. and to dynamically abstract these features into the lower bandwidth audio output.

As another example, audio may be considered the high bandwidth input type relative to a relatively low bandwidth output type. For example, the audio can be relatively high fidelity audio signal, while the low bandwidth output types can be a degraded audio signal. For example, a notch filter can be used to remove high and low frequencies from the high bandwidth audio input signal to create a degraded (but recognizable), low bandwidth audio output signal. Further, the high bandwidth audio signal can be degraded to such an extent that the low bandwidth audio output signal is unintelligible, but still conveys the impressions of loudness, tone, etc.

Alternatively, the high bandwidth input type can be converted to a low bandwidth output signal which provides haptic feedback to a receiver at a second communication station 14. For example, a receiver of the low bandwidth haptic signal may grasp a forced-feedback device such as a joystick at his communication station, and receive haptic feedback which is related to the high bandwidth audio generated at another communication station. As a more specific example, low frequencies of the high bandwidth audio as generated at a first communication station 12 can be converted into a rumbling feeling at a force feedback joystick at a second communication station that is remotely located with respect to the first communication station.

A yet third example of high bandwidth types is any high bandwidth input type, including video, audio, or combinations of the two which can be converted by the dynamic abstraction filter 82 to some form of abstract representation. For example, an object in a high bandwidth communication can be represented by a bouncing ball at a remote communication station. As the object in the video moves more quickly, the bouncing ball can move more quickly. Further, as a new object enters the video screen an additional bouncing ball can be added. Likewise, the bouncing balls can represent volume, pitch, etc. of a high bandwidth audio input at a remote communication station. Alternatively or additionally, the changing of the screen color of the remote communication station can represent changes in the high bandwidth video or audio at the sending communication station. Of course, the foregoing examples are simply a few examples of many possible high bandwidth/low bandwidth dynamic abstractions that are possible within the inventive scope of the present invention.

Figure 6:
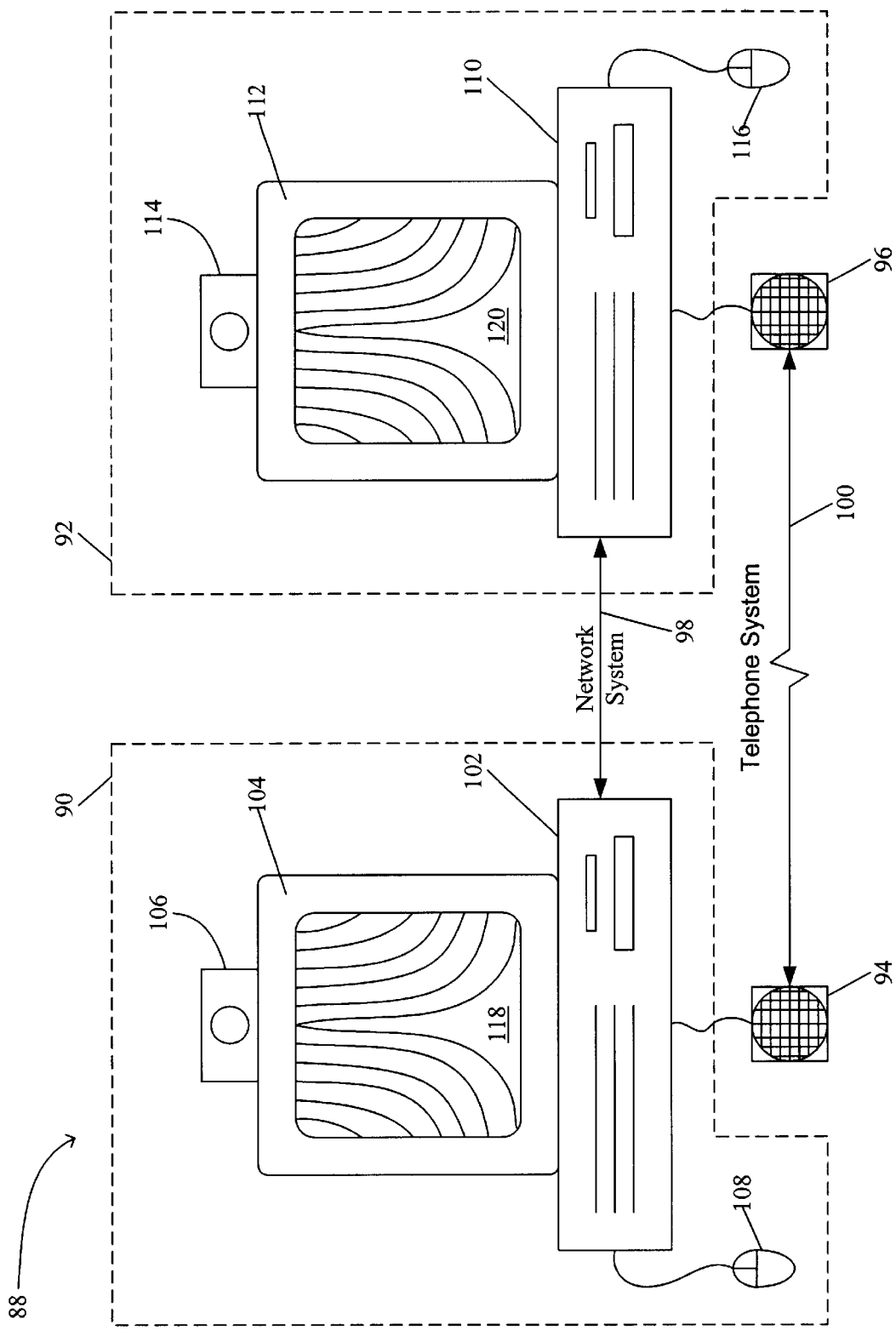
FIG. 6 is an illustration of another embodiment of a variable bandwidth communication system in accordance with the present invention.

In FIG. 6, a variable bandwidth communication system 88 includes a first communication station 90, a second communication station 92, a first speaker phone 94, a second speaker phone 96, and a network system 98 coupling the first communication 90 to the second communication station 92, and the telephone system 100 coupling the first speaker 94 to the second speaker phone 96. The first communication station 90 preferably includes a personal computer 102, a monitor 104, a video camera 106, an input device such as a mouse 108. Likewise, the second communication station 92 preferably includes a computer 110, a monitor 112, a video camera 114, and a video input device such as a mouse 116. The network system 98 may be a local area network, or a wide area network such as the internet. The speaker phones 94 and 96 are coupled to and are controlled by computers 102 and 110, and are preferably of conventional design and utilize standard telephone system 100. Monitors 104 and 112 include screens 118 and 120, respectively. Depicted on these screens are various images as will be discussed subsequently. The images may be selected by a number of input devices including pointer-type input devices such as the mice 108 and 116.

FIGS. 6A–6C illustrates three screen representations which communicates the receivers desire to communicate with remote communication stations and what bandwidth of communications the receiver desires. In FIG. 6A, the depiction of closed curtains 122 coupled with a drawn shade 124 illustrates no desire to communicate while the open curtain 122 with drawn shade 124 of FIG. 6B illustrates that the receiver would like a "presence" type display, i.e. to simply know if there is a person present at a remote communication station. Finally, the depiction of FIG. 6C with an open curtain 122 and an open shade 124 illustrates the desire for high bandwidth communication.

With additional reference to the table 126 of FIG. 6D, the representations of FIGS. 6A–6C allow three different "thresholds" of reception at a communication station. The higher the threshold, the lower the bandwidth requirement. For example, when the curtain and shade are closed as illustrated in FIG. 6A, the message to remote sender is that the receiver has no desire to communicate. This "high threshold" message requires very little bandwidth being communicated back and forth between the communication station. When the curtain is open and the shade is closed as in FIG. 6B this "intermediate threshold" condition indicates that the receiver would like to have a presence display and no more from a remote sender communication station. Such a presence display may be an illumination of the shade 124 when a remote sender is present at the communication station, and a darkened shade 124 when the remote sender is not present at his communication station. Such a presence display still requires a very low bandwidth connection between the two communication stations. However, when the curtain 122 and shade 124 are open the receiver is requesting full video and audio display on the screen. This is illustrated by the image 128 in FIG. 6C. This, of course, requires a high bandwidth connection or connections capable of supporting full video and audio between the two communication stations. In the example of FIG. 6, full video and audio display is accomplished by transferring video over the network system 98, and audio over the telephone system 100. It will therefore be apparent in high bandwidth communications, in particular, multiple communication channels may be used.

Figure 7:
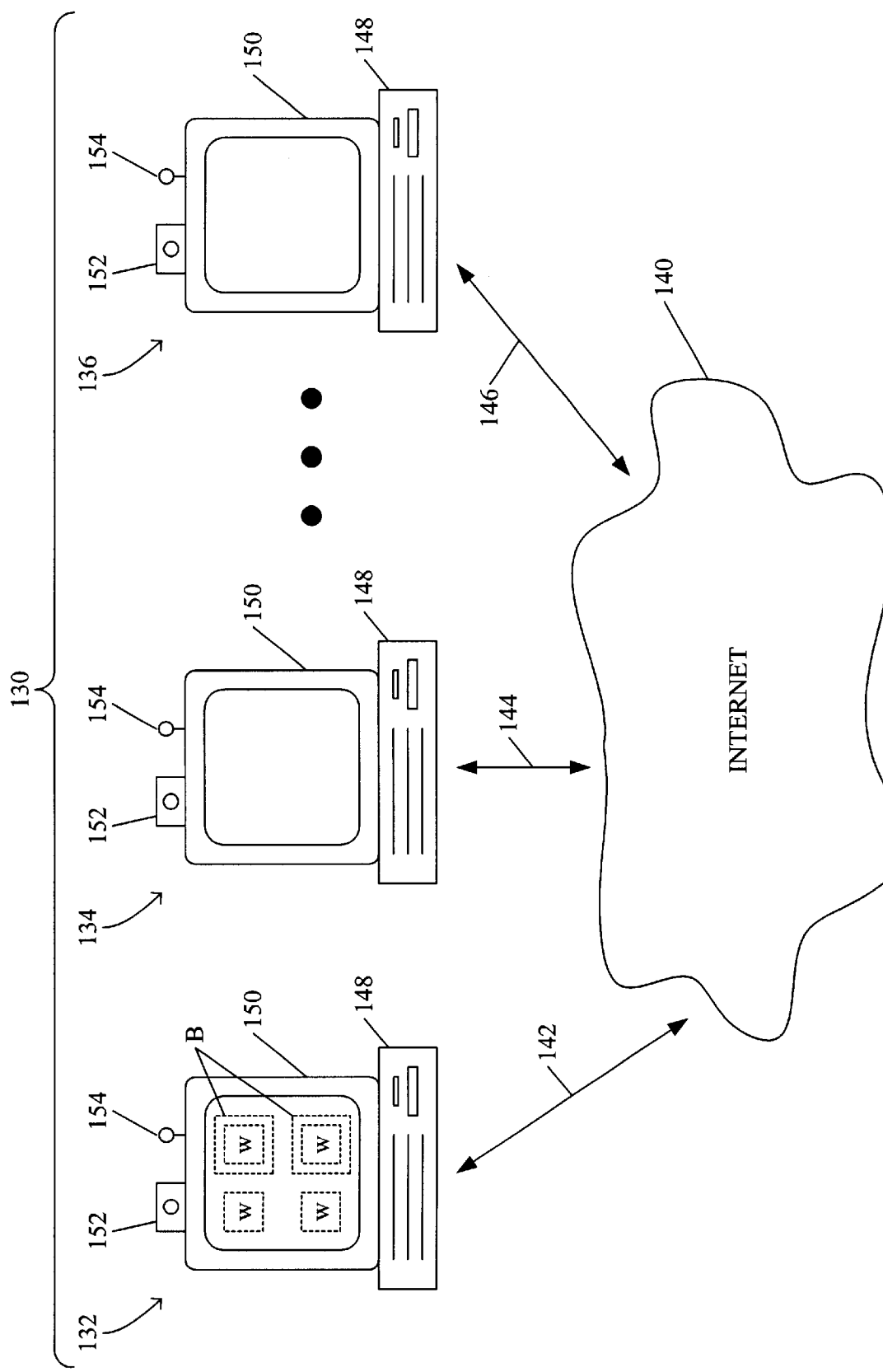
FIG. 7 is a variable bandwidth communication system illustrating three or more communication stations coupled together by a network.

While the variable communication system of the present invention has been previously described primarily in terms in two communication stations, is it also applicable to multiple communication stations, particularly when they are linked together by a local area network (LAN) or a wide area network (WAN), such as the Internet. In FIG. 7 a variable bandwidth communication system 130 includes multiple communication stations 132, 134, 136, etc. which, in this example, are coupled to the Internet 140 via internet connections 142, 144, 146, etc.

Each of the communication stations 132, 134, 136, etc. in this example includes a personal computer 148, a monitor 150, a video 152, and a microphone 154. Of course, there are other standard components of computer systems that may be part of the communication stations, such as keyboards, mice, network cards, etc. that are not shown in this simplified figure. By using the processes and apparatus of the present invention as was described previously, multiple communication stations can be in continuous, variable bandwidth, bi-directional communication with each other.

Figure 7A:
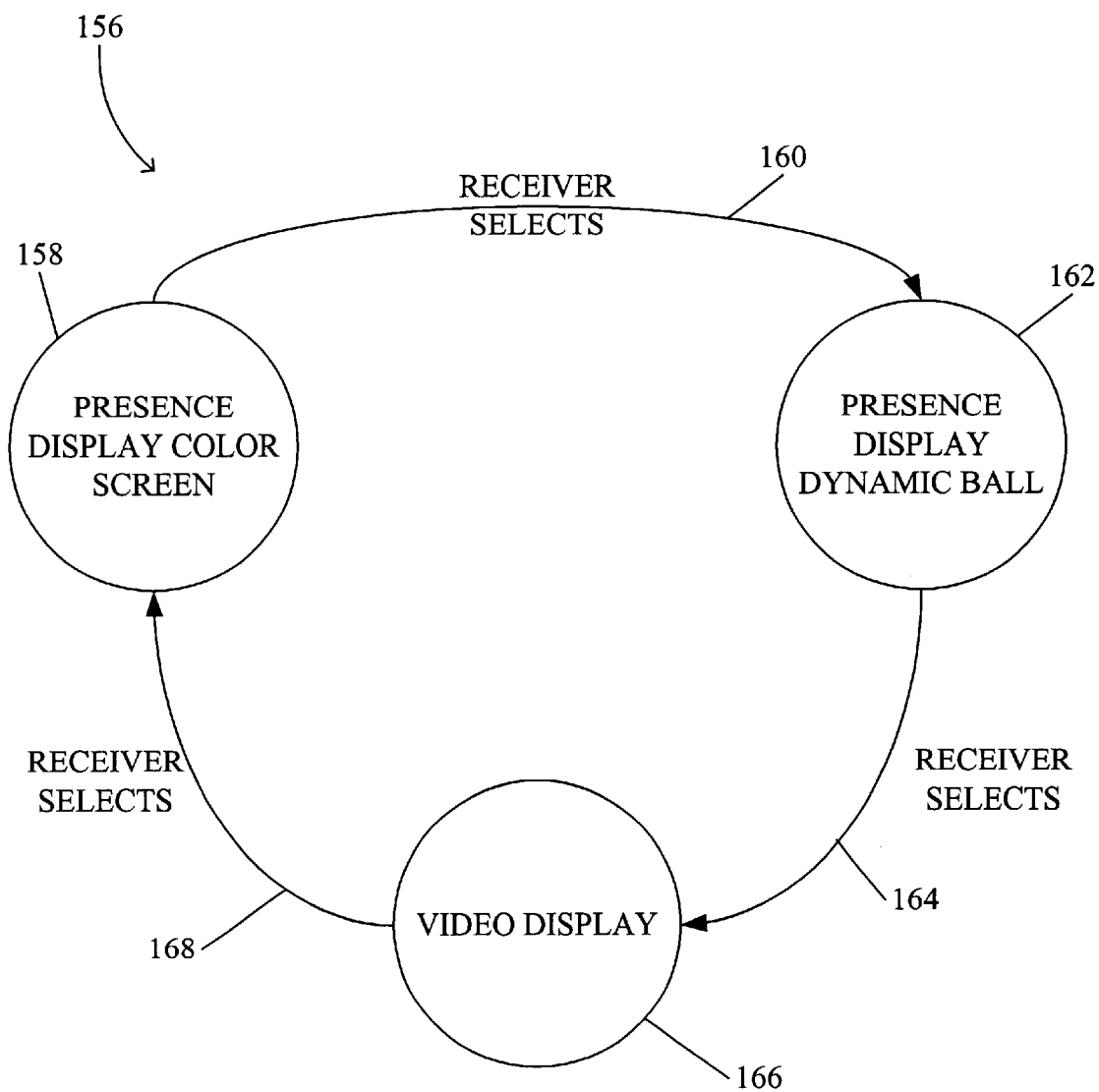
FIG. 7A is a state diagram illustrating the ability of a receiver to switch between various bandwidth displays when receiving a high bandwidth signal.

FIG. 7A illustrates a process 156 by which a receiver at a communication station can select the bandwidth of the display. As used herein, "display" can mean a video display, an audio display, a haptic display, or any other kind of sensory feedback display. By "display bandwidth" it is meant the amount of information per unit of time required to maintain the display.

In FIG. 7A a receiver communication station may start in a mode 158 wherein the screen of a monitor simply displays colors to indicate presence and lack of presence of individuals at remote communication stations. This is a high threshold, low bandwidth type display. The receiver can then make a selection 160 (e.g. by using a mouse to select a button on a screen of a monitor) to change the mode to a mode 160 which displays presence with a dynamically bounding ball. This is a lower threshold, higher bandwidth display which not only indicates the presence of an individual at another communication station but also provides information about the sender, such as whether he is in motion. The receiver at the communication station can then make a selection 164 to convert to a video display mode 166 for a full video display. This is, of course, a very low threshold, very high bandwidth type display. The receiver then can make a selection 168 to return to the high threshold low bandwidth of mode 158.

While this invention has been described with reference to certain preferred embodiments, it will be apparent to those skilled in the art that there are many alterations, permutations, equivalents, and additions within the scope of the present invention. For example, in multiple communication station environments such as that shown in FIG. 7, an embodiment of the present invention displays a plurality of windows W which can correspond, one each, with another communication system. Each of these windows can use thresholding and multiple bandwidth bi-directional communication with one of the remote communication systems. For example, a number of the windows W can be in a low bandwidth, high threshold mode while, perhaps, one of the windows W can be in a low threshold, high bandwidth display mode. This would allow the user of the communication station to focus his or her attention on the high bandwidth display window (e.g. streaming video) and still have presence or other lower bandwidth type displays (with less distracting, high thresholds) in the other windows.

A further refinement is the addition of "bezels" B around the windows W. These bezels B surround the windows W like a picture frame, but they are active to present a self-image of the person using the communication station as picked up by the camera. Since the user would only see the edges of his image, this self-image is less distracting than if an entire full-face view were presented in a window on the screen. Further, the bezel would allow the user to see how he was being presented to remote users, i.e. whether they were viewing full video, 'tooned versions of his image, a bouncing ball, etc.

It should be further noted that while many of the embodiments of the present invention have been described using computer systems as the enabling technology, that much simpler, dedicated devices are also suitable for many situations. For example, by having only an audio display rather than a video display, the cost of the communication system can be much reduced. This would be applicable to a "twitter" embodiment of the present invention, wherein an audio display can provide different sounds such as birds twittering, water gurgling, etc.

Therefore, while invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A variable bandwidth communication system comprising:

a first communication station capable of transmitting at a first bandwidth and a second bandwidth greater than said first bandwidth, and capable of receiving at a third bandwidth and a fourth bandwidth greater than said third bandwidth, wherein the transmitting bandwidth of said first communication station is selectable by a first user; and a second communication station coupled to said first communication station for continuous, bi-directional communication with said first communication station, said second communication station being capable of receiving at said first bandwidth and said second bandwidth, and capable of transmitting at said third bandwidth and a fourth bandwidth, wherein the transmitting bandwidth of said second communication station is selectable by a second user.

2. A variable bandwidth communication system as recited in claim 1 wherein said first bandwidth and said third bandwidth are about the same, and wherein said second bandwidth and said fourth bandwidth are about the same.

3. A variable bandwidth communication system as recited in claim 2 wherein said second bandwidth is at least two orders of magnitude greater than said first bandwidth.

4. A variable bandwidth communication system as recited in claim 3 wherein said first communication system is capable of displaying communications received at said fourth bandwidth at a first lower bandwidth display level.

5. A variable bandwidth communication system as recited in claim 4 wherein said lower bandwidth display level is at about said third bandwidth.

6. A variable bandwidth communication system as recited in claim 5 wherein said second communication system is capable of displaying communications received at said second bandwidth at a second lower bandwidth display level.

7. A variable bandwidth communication system as recited in claim 6 wherein said second lower bandwidth display level is at about said first bandwidth.

8. A variable bandwidth communication system as recited in claim 7 wherein said second bandwidth is capable of transmitting video communications.

9. A variable bandwidth communication system as recited in claim 8 wherein said first bandwidth is capable of transmitting at least one of a representational video communication, a reduced resolution video communication, an audio communication, and an abstract representational communication.

10. A variable bandwidth communication system as recited in claim 7 wherein said second bandwidth is capable of transmitting audio communications.

11. A variable bandwidth communication system as recited in claim 10 wherein said first bandwidth is capable of transmitting at least one of a degraded audio communication, a haptic communication, and an abstract representational communication.

12. A method for variable bandwidth communications comprising:

selectively and continuously transmitting communications from a first communication station at one of a first bandwidth and a second bandwidth, where said second bandwidth is greater than said first bandwidth, and continuously receiving communications at one of a third bandwidth and a fourth bandwidth, where said fourth bandwidth is greater than said third bandwidth; and selectively and continuously transmitting communications from a second communication station at one of said third bandwidth and said fourth bandwidth, and continuously receiving communications at one of said first bandwidth and a second bandwidth.

13. A method for variable bandwidth communications as recited in claim 12 wherein said first bandwidth and said third bandwidth are about the same, and wherein said second bandwidth and said fourth bandwidth are about the same.

14. A method for variable bandwidth communications as recited in claim 13 wherein said second bandwidth is at least two orders of magnitude greater than said first bandwidth.

15. A method for variable bandwidth communications as recited in claim 14 further comprising selectively converting communications received by said first communication system at said fourth bandwidth to a first lower bandwidth display level.

16. A method for variable bandwidth communications as recited in claim 15 wherein said lower bandwidth display level is at about said third bandwidth.

17. A method for variable bandwidth communications as recited in claim 16 further comprising selectively converting communications received by said second communication system at said second bandwidth to a first lower bandwidth display level.

18. A method for variable bandwidth communications as recited in claim 17 wherein said second lower bandwidth display level is at about said first bandwidth.

19. A method for variable bandwidth communications as recited in claim 18 wherein said second bandwidth is capable of transmitting video communications.

20. A method for variable bandwidth communications as recited in claim 19 wherein said first bandwidth is capable of transmitting at least one of a representational video communication, a reduced resolution video communication, an audio communication, and an abstract representational communication.

21. A method for variable bandwidth communications as recited in claim 18 wherein said second bandwidth is capable of transmitting audio communications.

22. A method for variable bandwidth communications as recited in claim 21 wherein said first bandwidth is capable of transmitting at least one of a degraded audio communication, a haptic communication, and an abstract representational communication.

* * * * *